April 16, 1935. H. H. MEYER 1,997,802

FISH LURE

Filed Dec. 1, 1931

INVENTOR
Henry H. Meyer.
ATTORNEYS

Patented Apr. 16, 1935

1,997,802

UNITED STATES PATENT OFFICE 1,997,802

FISH LURE

Henry H. Meyer, Detroit, Mich., assignor to Lou J. Eppinger, Detroit, Mich.

Application December 1, 1931, Serial No. 578,309

9 Claims. (Cl. 43—42)

My invention relates to fish lures or animated fishing bait.

An object of the present invention is to provide a fish lure or animated artificial bait having a plurality of trailing lure elements which are arranged to simulate a kicking motion resembling swimming minnows, or the kicking of a frog.

The invention further provides an artificial bait or lure wherein the lure elements are arranged to contact with each other and produce sound to attract the fish incident to the motion of the lure elements through the water.

It is another object of the invention to provide an artificial bait or lure wherein the minnow-like movement or the frog-like movement of the lure elements can be controlled by the fisherman at will.

With the preceding and other objects and advantages in mind the invention consists in the novel combination of elements, constructions and arrangement of parts, wherein Figure 1 is a plan view;

Figure 1:
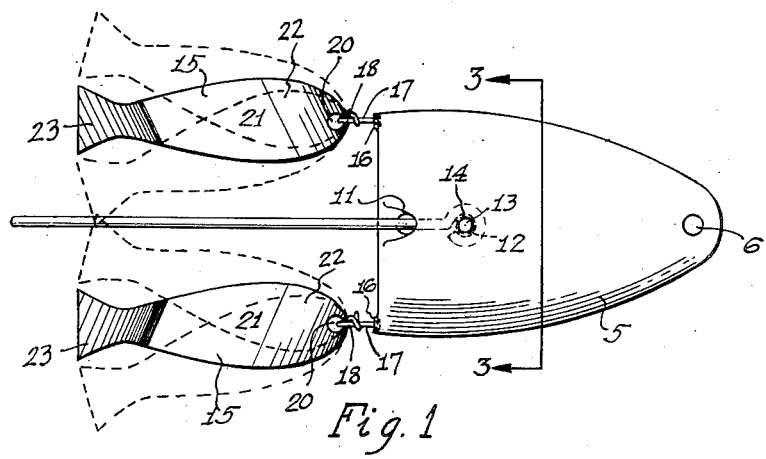
Figure 2:
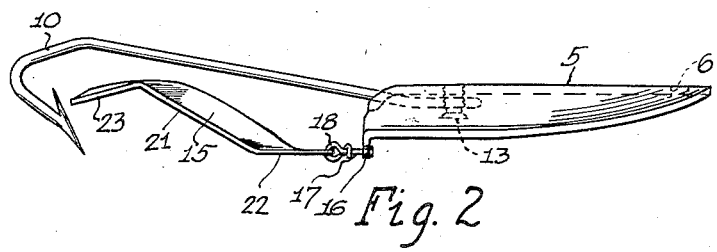
Fig. 2 is a side elevation.

Referring to the invention in detail a concavo-convex metal head piece or plate 5 shaped to simulate the head of a frog or minnow and having an opening 6 at its forward end for attachment to a fishing line is provided. A hook 10 extends rearwardly from the head piece or plate 5 and h- its shank extended through a central opening 11 in the rear end of the head piece or plate 5. The hook is detachably connected with the part 5 and for this purpose it is formed with an eye 12 with which a set screw 13 is engaged, the latter being threadedly engaged with a transverse opening 14 in the head piece or plate.

A pair of lure elements 15 is provided and are arranged to trail the body or plate 5 and are capable of simulating the swimming action of a minnow or the kicking action of a frog, and at the same time produce a disturbance similar to that produced by the legs of a frog so as to attract the fish. Formed with the rear end of the body or plate 5 and disposed at its outer edges is a pair of downwardly extending perforated ears 16 and supported therein for movement about a horizontal axis are swivels 17, having eyes 18, loosely engaged with perforations 20 in one end of each of the lure elements.

Figure 4:
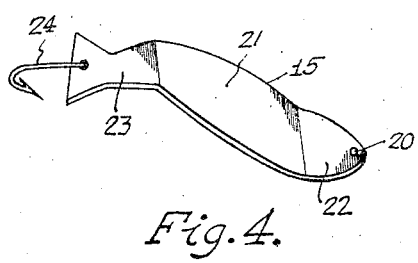
Fig. 4 is a perspective of a modification of the lure element.

As shown in Fig. 4 each of the lure elements consists of a flat metal body 21 having the configuration of a minnow. The head portion 22 or that portion connected with the swivel is turned at an oblique angle with respect to the longitudinal axis of the body while the tail portion 23 is turned at an oblique angle of a slightly greater pitch. Thus, by reason of the shape of the lures they are caused to bodily rotate or spin as the device is drawn through the water. Incident to the rotation of these lures they will strike against each other causing them to move apart or separate laterally simulating a kicking action which resembles the swimming of a frog or the swimming of two minnows. Also a sound is produced each time the lure elements contact with each other and thereby attract the fish. It will be apparent that as the device is drawn through the water and with the lures spinning about the axis 21 they will at intervals contact each other as above stated to cause them to rebound or separate from each other to simulate the kicking action above mentioned. It will also be apparent that with the lures spinning behind the body or plate 5 they will act as a guard for the impaling end of the hook to prevent weeds from coming in contact therewith.

As shown in Fig. 4 each of the lure elements may be provided with a small hook 24.

As will be seen, the lure comprises the head member 5 and the trailing members 15, and may have the single hook 10 carried by the head member or the individual hook 24 carried by each of the trailing members. All of the members are of metal.

Figure 3:
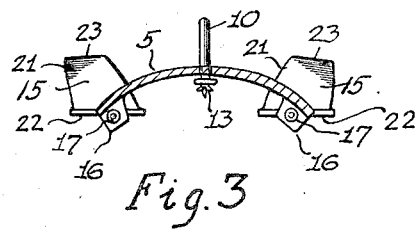
Fig. 3 is a transverse section on the line 3—3 of Fig. 1.

Referring to the head member 5, it will be seen that in plan as well as in cross-section, the member is formed symmetrical relative to the central longitudinal line of the lure, with the opening 6, by which the lure is attached to the line, located on such longitudinal line at the forward end of the member. Since the member is curved in cross section, as indicated in Fig. 3, it can be understood that the member, when being drawn through the water by retrieving the fishing line or in trolling, will travel in a practically steady path, all parts of the member which could offer resistance to the advance of the member being similar in structure and in relation to such longitudinal line. Hence the member itself has no structure which would tend to cause the member to be forced laterally of such path under the pull of the fishing line. No spinner is employed in advance of the member; in fact, a spinner which is so arranged as to tend to provide such deviation through the spinner action, would be ineffective to provide such deviation directly lateral due to the curvature of the body. Since the trailing members provide the movable action generally provided by the spinner, no advance spinner is needed.

On the contrary, when the lure is being cast and permitted to sink freely in the water, the member, although of metal, does not sink downward in a straight or even an approximately straight line. Because of its symmetrical shape and curved cross-section, the member, in passing downward, will tend to shift about or "skitter", so that by the time it has passed downward to a considerable depth it is likely to have passed a considerable distance from the point where it entered the water. This is of direct advantage when casting, especially if the lure has landed somewhat heavily—with a delayed retrieve, with the beginning of the latter at a point somewhat remote from the point of entry, any detrimental effect of the heavy landing of the lure is eliminated, since the latter has moved silently through the water to a relatively remote point and in no direct line, so that the appearance of the lure at the point where the retrieve begins does not provide a startling effect on fish at this point.

The trailing members 15, also of metal, are connected to the head member 5 by individual swivels, as indicated, the location of the swivelling points also being symmetrical to the mid-longitudinal line referred, and which is practically a continuation of the line of pull. Hence, the trailing members are also symmetrically disposed relative to such line, and therefore provide no material effect in providing deviation of the head member in trolling service or when the lure is being retrieved. As indicated, the trailing members are of sheet metal, and generally have the contour of a minnow, with the swivel located in an opening at the head positioned substantially on the mid-longitudinal line of the member, so that when the lure is advancing, the pull would, if the trailing members were in a flat plane, also draw these forward in a substantially non-deviating plane. However, the lure is designed to present its movable effect through these members, and the latter are therefore bent out of a flat plane at two points, as indicated in the drawing, the line of bend extending at an angle to such longitudinal line as well as to a line normal thereto, with the bend lines practically parallel. The bend is in opposite directions relative to the plane of the central portion of the member, but does not change the general plane to a very large extent. In fact, the relative bending is such that when the lure is drawn slowly through the water, the trailing members have little or no spinning action, the bends being sufficient to cause somewhat of a fluttering action during the advance. If, however, the speed of advance be materially increased, the members will tend to spin at slow speed, due to the action of the bends. As the bends of one trailing member are arranged at an angle generally reverse to that of the companion trailing member, the spinning will be in opposite directions.

But in addition to the spinning effect, an additional effect is produced due to the angle of bend. Since the member is located on the mid-longitudinal line, the effect of the direction of bend, in the presence of the straight pull, is to cause the rear end of the member to tend to move in a circle, or if spinning is not present, to swing back and forth laterally, with the result that the rear ends of the members come forcibly into contact—sufficiently so as to produce a sound; in actual service conditions it has been found that the sound is sufficiently loud to be heard by the fisherman—since sound travel in the water is better than in the air, it is evident that the repeated sounds at regular intervals provide an additional lure effect by serving to attract attention.

As pointed out, the lure is usually provided with the large hook 10 secured removably to the head member by screw 13, the hook lying in the mid-longitudinal line of the lure. However, when fishing for certain fish—having the habit of striking at the tail of a swimming minnow, and for which a small hook is preferably used, the hook 10 may be removed, and the small hooks attached to the tail portions of the trailing members, as indicated in Fig. 4.

The lure is capable of producing a plurality of effects in service, these being controlled by the fisherman. If the lure is advanced slowly by slow retrieving, the lure gives the effect of a pair of minnows trailing and appearing to be chasing or following their dinner; since the latter is the non-deviating head member 5, the illusion is made more complete since the dinner in such case would not be a swimming food—it would appear as a floating dinner. When, however, the speed of advance is increased, so that the movements of the trailing members are animated, the advancing lure takes on the effect of a swimming frog, in which the non-deviating head member appears as the body of the frog, and the trailing members appear as the legs, with the latter kicking; and coupled with the latter effect is the presence of the sound for the purpose of arresting the attention of distant fish.

Hence, the lure can serve the purposes of two distinct types of lure, and, through the change in the hooks referred to, can add the additional effect of utilizing the lure for a type of fish which the large hook is generally unable to reach. The change from one type of lure to the other is directly under control of the fisherman and can be provided during the retrieving—the type of activity is controlled by the rate of advance of the lure, so that the fisherman is able to duplicate his cast over the same field, and by simply changing the speed of advance in the retrieve, can present the characteristics of two distinctive baits, although the same structure is employed in both cases.

The ability to produce this double bait effect is due to the fact that the advance portion of the lure is so shaped that in action it presents no motion such as would tend to attract the fish away from the trailing portion. As shown, the head member is relatively thin, being of sheet metal and curved uniformly throughout its length, so that the member is generally of uniform thickness on a cross-section of the member. The variation from this condition is the projections 16 at the rear, and to which the trailing members are swivelled, and any water disturbance by the movement of these, is practically at the head of the zone in which the lure presents the animated condition. While the hook is secured to this sheet metal portion and thus tends to disturb this condition, it is secured to the under surface and in the rear zone of the head member so that any effect of this is also provided at the portion of the lure where the real lure effect is being provided by the animated trailing members. In other words, instead of the advance portion of the lure presenting an animated effect, as by the use of a spinner, such advance end in the present lure is free from animation, and provides little or no disturbance to the water as it is drawn forward. This feature thus takes on the characteristics of the body of a frog, and where the trailing members have the fluttering effect, through the slow retrieving action—thus varying from the activities of the legs of the frog—the head member appears as simply an inanimate floating member, with the seeming minnows appearing as attempting to follow it.

What I claim is:—

1. A fish lure comprising an inanimate head member and a pair of trailing members adapted to have animated characteristics by the advance of the lure, said head member having a fore and aft length approximating half the length of the lure and having its formation symmetrical with respect to the mid-longitudinal line of the member and lure, which line corresponds to the line of pull provided by the fishing line, said trailing members having a swivelled connection with the rear of the head member, and positioned symmetrical to such mid-longitudinal line, said lure having a desired hook arrangement to complete the lure.

2. A fish lure as in claim 1 characterized in that the head member is curved laterally and of substantially uniform thickness cross-sectionally, a plan view of the member presenting its greatest width within the rear zone of the member.

3. A fish lure as in claim 1 characterized in that the head member is of sheet metal characteristic and of uniform curvature laterally to present the member as of generally uniform characteristic on a longitudinal section, with a plan view of the member presenting its greatest width in the rear zone of the member.

4. A fish lure as in claim 1 characterized in that the member is of sheet metal characteristic and curved substantially uniformly in a lateral direction, the rear zone having a pair of aligned openings on the mid-longitudinal line with the body depressed immediately in rear of the rearmost opening to permit of the attachment of a hook eye at the forward opening and beneath the under surface of the member and permit the hook shank to pass to the upper surface of the member through the rear opening, the attachment of the hook eye being by means of a removable screw.

5. A fish lure as in claim 1 characterized in that each of the trailing members is of sheet metal characteristic with each having fore and aft zones bent angularly to the central zones, with the bent zones extending opposite to each other relative to the plane of the central zone, and with the bends arranged to provide animation characteristics to the member as it is advanced by the head member.

6. A fish lure as in claim 1 characterized in that each of the trailing members is of sheet metal characteristic with each having fore and aft zones bent laterally and angularly to the plane of the central zone and with the bent zones extending opposite to each other relative to the plane of the central zone, the line of bend of the respective zones extending in parallelism and angular to a mid-longitudinal line of the member and a line perpendicular thereto.

7. A fish lure as in claim 1 characterized in that each of the trailing members is of sheet metal with the fore and aft zones bent relative to the central zone and with the line of bend extending angular to the mid-longitudinal line of the member and a line perpendicular thereto, the respective bends being in substantial parallelism in the member and with the direction of bend of one terminal zone opposite that of the other terminal zone, the angle of bend of one member being the reverse of that of the other member, whereby the animated movements of one member will be substantially opposite those of the other member.

8. A fish lure as in claim 1 characterized in that the trailing members are of sheet metal characteristic and of generally similar formation including fore and aft zones bent angularly to the plane of the central zone, the bending being on lines reversed in the two members and so arranged that the members during slow advance of the lure will simulate the actions of swimming minnows and during more rapid advance will swing relative to the swivel connection so as to bring the terminal portions of the members into intermittent contact, whereby the lure under slow advance will produce the effect of minnows chasing a floating dinner and under rapid advance will produce the effect of a swimming frog.

9. A fish lure, as in claim 1 characterized in that the trailing members are metallic and formed with angularly bent portions which cause said trailing members to produce the effect of swimming minnows chasing a floating dinner when the lure is advanced slowly and to produce with the head member the effect of a swimming frog when the lure is advanced rapidly.

HENRY H. MEYER.